United States Patent
Muraoka

(10) Patent No.: US 7,873,853 B2
(45) Date of Patent: Jan. 18, 2011

(54) DATA STORAGE APPARATUS, POWER CONTROL, METHOD, AND COMMUNICATION APPARATUS

(75) Inventor: Jochiku Muraoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 758 days.

(21) Appl. No.: 11/782,403

(22) Filed: Jul. 24, 2007

(65) Prior Publication Data
US 2008/0028247 A1 Jan. 31, 2008

(30) Foreign Application Priority Data
Jul. 28, 2006 (JP) ............... 2006-205714

(51) Int. Cl.
G06F 1/00 (2006.01)
G06F 12/00 (2006.01)
G06F 11/00 (2006.01)
H04L 9/32 (2006.01)

(52) U.S. Cl. ............ 713/340; 713/172; 713/300; 711/152; 711/163; 714/22; 714/27

(58) Field of Classification Search ........... 713/172, 713/300, 340; 711/152, 163; 714/22, 27
See application file for complete search history.

(56) References Cited

U.S. PATENT DOCUMENTS 5,513,337 A 4/1996 Gillespie et al.
5,664,157 A * 9/1997 Takahira et al. ............ 703/23
6,264,108 B1 * 7/2001 Baentsch ................ 235/487
6,396,400 B1 * 5/2002 Epstein et al. ............ 340/550
6,715,078 B1 * 3/2004 Chasko et al. ............ 713/193
7,341,182 B2 * 3/2008 Lai et al. .................. 235/380

FOREIGN PATENT DOCUMENTS

| CN | 1149342 | 5/1997 |
|---|---|---|
| JP | 11-353446 | 12/1999 |
| JP | 2005-056439 | 3/2005 |
| JP | 2005-202719 | 7/2005 |
| JP | 2006-013603 | 1/2006 |

OTHER PUBLICATIONS

Office Action dated Nov. 7, 2008, for corresponding Chinese Application No. 200710137617.

* cited by examiner

Primary Examiner—Stefan Stoynov
(74) Attorney, Agent, or Firm—K&L Gates LLP

(57) ABSTRACT

A data storage apparatus includes a memory, a monitoring unit for monitoring an unauthorized action on data stored in the memory, a first power supply for supplying power to the monitoring unit, and a power storage unit which supplies power to the monitoring unit when supply of the power from the first power supply to the monitoring unit is stopped and which is charged while the power is being supplied from the first power supply to the monitoring unit.

9 Claims, 13 Drawing Sheets

DATA STORAGE APPARATUS, POWER CONTROL, METHOD, AND COMMUNICATION APPARATUS

CROSS REFERENCES TO RELATED APPLICATIONS

The present application claims priority to Japanese Patent Application JP 2006-205714 filed in the Japanese Patent Office on Jul. 28, 2006, the entire contents of which are incorporated herein by reference.

BACKGROUND

The present application relates to data storage apparatuses, power control methods, and communication apparatuses, and, in particular, to a data storage apparatus, power control method, and communication apparatus for physically improving tamper proofness.

In recent years, apparatuses (see, for example, Japanese Unexamined Patent Application Publication No. 2005-56439) in which data stored in a memory can be protected by providing a monitoring circuit for monitoring a tampering action such as opening and destruction of a housing have come into widespread use.

Such apparatuses may each include a backup power supply, such as a battery, for the monitoring circuit so that the tampering action can be monitored even if a main power supply is in an OFF state.

When the backup power supply is provided for the monitoring circuit, there is a possibility that, after removing the backup power supply to stop the operation of the monitoring circuit, data may be intercepted and tampered with.

SUMMARY

The present application has been made in view of the above-described circumstances. It is desirable to physically improve tamper proofness.

A data storage apparatus according to a first embodiment includes a memory, monitoring means for monitoring an unauthorized action on data stored in the memory, a first power supply for supplying power to the monitoring means, and power storage means for supplying power to the monitoring means when supply of the power from the first power supply to the monitoring means is stopped, the power storage means being charged while the power is being supplied from the first power supply to the monitoring means.

The memory may be volatile, and the first power supply may further supply the power to the memory.

The data storage apparatus according to the first embodiment may further include power-supply control means. When supply of the power from the first power supply to the memory is stopped, the power storage means may further supply the power to the memory, and, when a predetermined time has elapsed after the supply of the power from the first power supply to the memory is stopped, the power-supply control means may stop supply of the power from the power storage means to the memory.

The data storage apparatus according to the first embodiment may further include a second power supply for supplying power to the monitoring means. The first power supply may be a backup power supply for supplying power to the monitoring means when the second power supply is turned off, and the power storage means may be charged by one of the first power supply and the second power supply.

The first power supply may be a battery, and the power storage means may be a capacitor.

A power control method, according to a second embodiment, for a data storage apparatus including a memory, and monitoring means for monitoring an unauthorized action on data stored in the memory, includes the steps of charging power storage means included in the data storage apparatus while power is being supplied from a power supply to the monitoring means, and, when supply of the power from the power supply to the monitoring means is stopped, supplying power from the power storage means to the monitoring means.

A communication apparatus, according to a third embodiment, for communicating with an apparatus having a noncontact integrated-circuit-card function, includes a memory for storing data read from the apparatus having the noncontact integrated-circuit-card function, monitoring means for monitoring an unauthorized action on the data stored in the memory, a power supply for supplying power to the monitoring means, and power storage means for supplying power to the monitoring means when supply of the power from the first power supply to the monitoring means is stopped, the power storage means being charged while the power is being supplied from the first power supply to the monitoring means.

In the first and second embodiments, while power is being supplied from a power supply to monitoring means, power storage means is charged, and, when supply of the power from the power supply to the monitoring mean is stopped, power is supplied from the power storage means to the monitoring means.

In the third embodiment, while power is being supplied from a power supply to monitoring means, power storage means is charged, and, when supply of the power from the power supply to the monitoring mean is stopped, power is supplied from the power storage means to the monitoring means.

According to the first, second, or third embodiment, power can be supplied to monitoring means for monitoring an unauthorized action on data stored in a memory. In addition, according to the first, second, or third embodiment, tamper proofness can be physically improved.

Additional features and advantages are described herein, and will be apparent from, the following Detailed Description and the figures.

DETAILED DESCRIPTION

Figure 5:
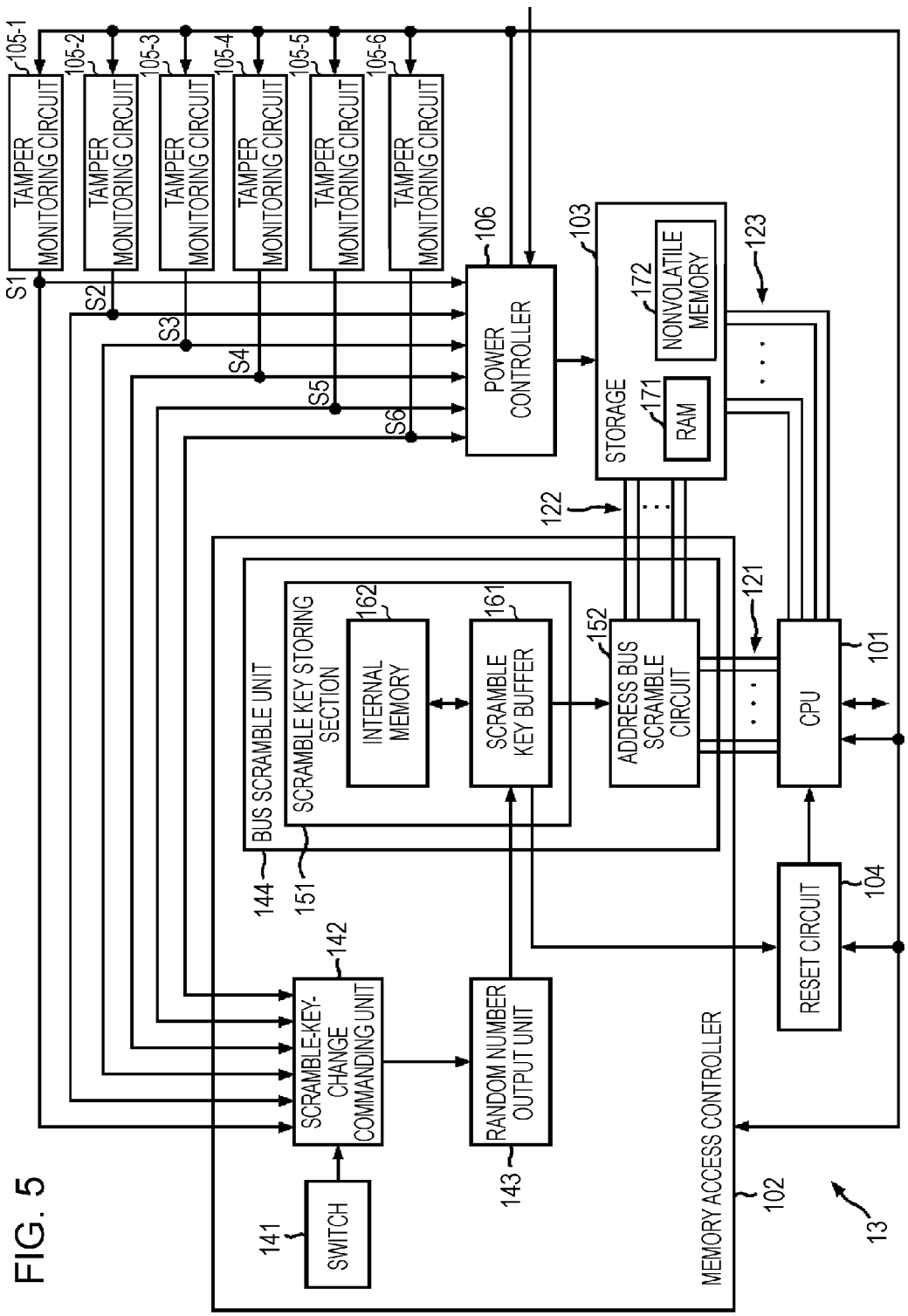
FIG. 5 is a block diagram showing a functional configuration of the control module shown in FIG. 1.

A data storage apparatus (e.g., the control module 13 shown in FIG. 1) according to the first embodiment includes a memory (e.g., the RAM 171 shown in FIG. 5), monitoring means (e.g., the tamper monitoring circuits 105-1 to 105-6 shown in FIG. 5) for monitoring an unauthorized action on data stored in the memory, a first power supply (e.g., the battery 351 shown in FIG. 10) for supplying power to the monitoring means, and power storage means (e.g., the capacitor 355 shown in FIG. 10) for supplying power to the monitoring means when supply of the power from the first power supply to the monitoring means is stopped, the power storage means being charged while the power is being supplied from the first power supply to the monitoring means.

Figure 10:
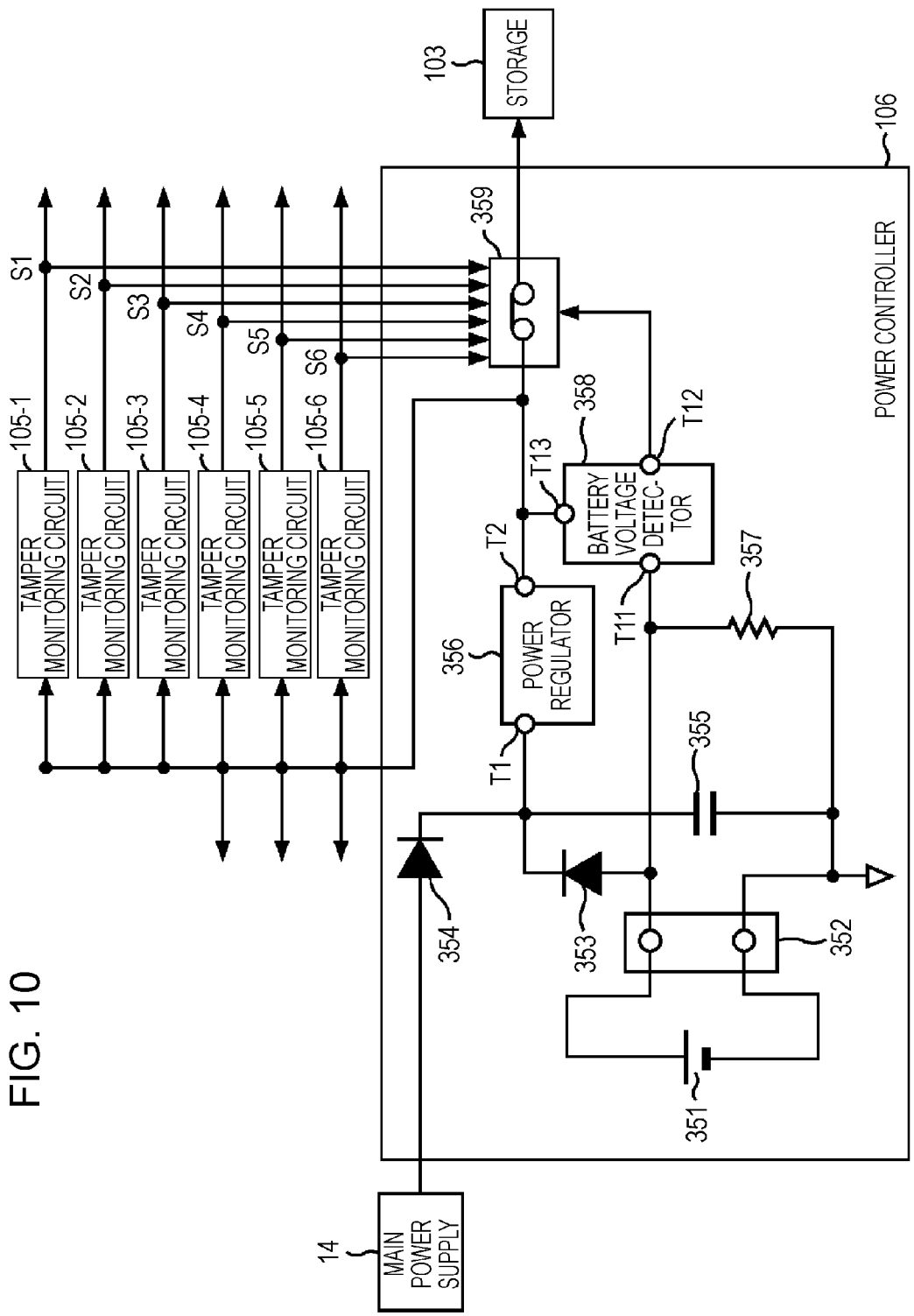
FIG. 10 is a circuit diagram showing an example of the configuration of the power controller shown in FIG. 5.

The data storage apparatus according to the first embodiment further includes power-supply control means (e.g., the battery voltage detector 358 shown in FIG. 10). When supply of the power from the first power supply to the memory is stopped, the power storage means may further supply the power to the memory, and, when a predetermined time has elapsed after the supply of the power from the first power supply to the memory is stopped, the power-supply control means may stop supply of the power from the power storage means to the memory.

The data storage apparatus according to the first embodiment further includes a second power supply (e.g., the main power supply 14 shown in FIG. 1) for supplying power to the monitoring means. The first power supply may be a backup power supply for supplying power to the monitoring means when the second power supply is turned off, and the power storage means may be charged by one of the first power supply and the second power supply.

A power control method, according to the second embodiment, for a data storage apparatus (e.g., the control module 13 shown in FIG. 1) including a memory (e.g., the RAM 171 shown in FIG. 5), and monitoring means (e.g., the tamper monitoring circuits 105-1 to 105-6 shown in FIG. 5) for monitoring an unauthorized action on data stored in the memory, includes the steps of charging power storage means (e.g., the capacitor 355 shown in FIG. 10) included in the data storage apparatus while power is being supplied from a power supply (e.g., the battery 351 shown in FIG. 10) to the monitoring means, and, when supply of the power from the power supply to the monitoring means is stopped, supplying power from the power storage means to the monitoring means.

A communication apparatus (e.g., the reader-writer 1 shown in FIG. 1), according to the third embodiment, for communicating with an apparatus (e.g., the IC card 2 shown in FIG. 1) having a noncontact integrated-circuit-card function, includes a memory (e.g., the RAM 171 shown in FIG. 5) for storing data read from the apparatus having the noncontact integrated-circuit-card function, monitoring means (e.g., the tamper monitoring circuits 105-1 to 105-6 shown in FIG. 5) for monitoring an unauthorized action on the data stored in the memory, a power supply (e.g., the battery 351 shown in FIG. 10) for supplying power to the monitoring means, and power storage means (e.g., the capacitor 355 shown in FIG. 10) for supplying power to the monitoring means when supply of the power from the first power supply to the monitoring means is stopped, the power storage means being charged while the power is being supplied from the first power supply to the monitoring means.

An embodiment is described below with reference to the accompanying drawings.

Figure 1:
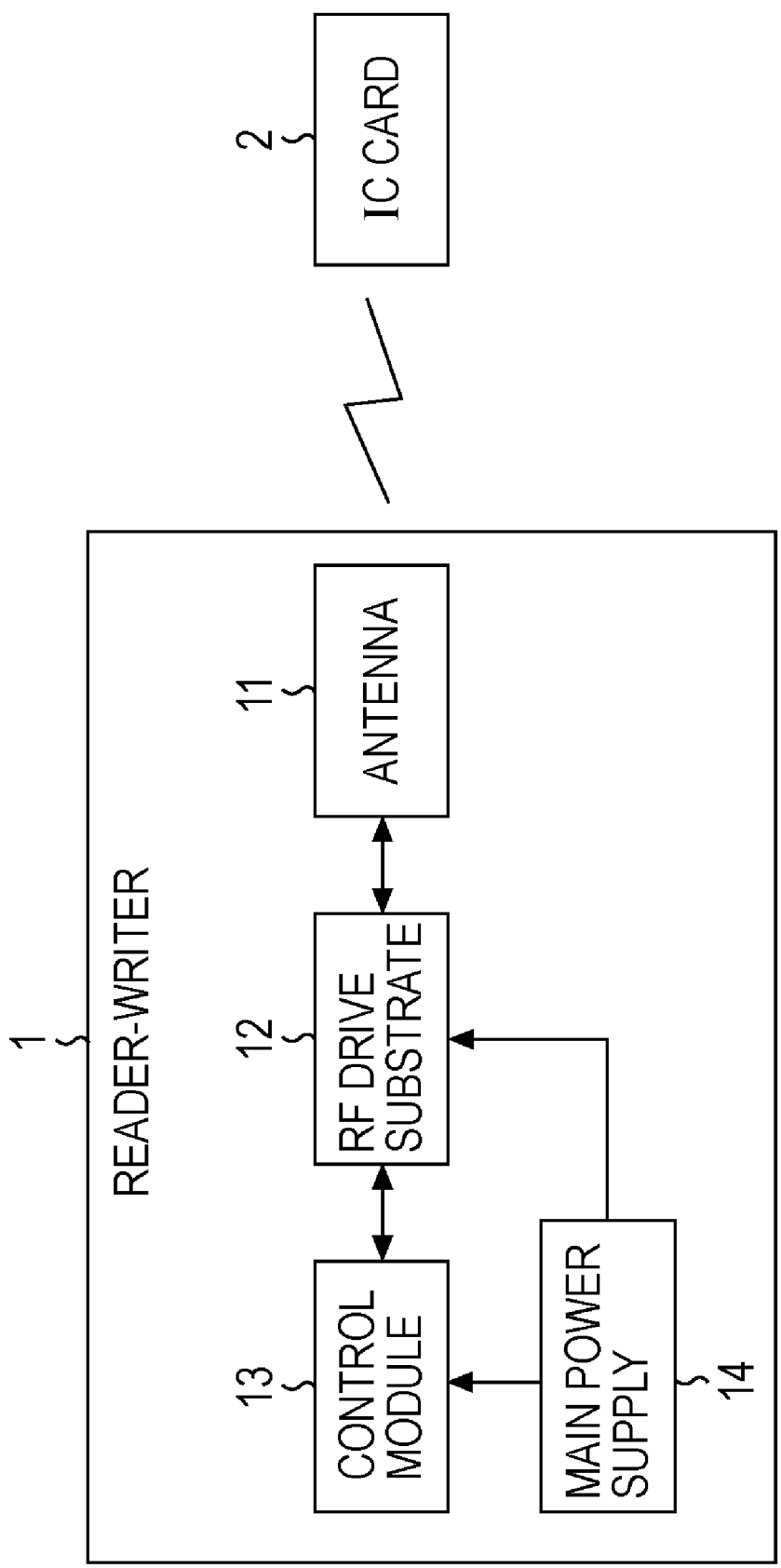
FIG. 1 is a block diagram showing a reader-writer according to an embodiment.

FIG. 1 is a block diagram showing an example of a reader-writer 1 to which the embodiment is applied. The reader-writer 1 includes an antenna 11, an RF (radio frequency) drive substrate 12, a control module 13, and a main power supply 14.

The RF drive substrate 12 performs electromagnetic-induction proximity communication with an IC (integrated circuit) card 2 of a noncontact type by using a carrier having a single frequency via the antenna 11. As the frequency of the carrier used by the RF drive substrate 12, for example, an ISM (Industrial Scientific Medical) band of 13.56 MHz (megahertz), or the like, may be used. The proximity communication represents communication in which two apparatuses can communicate with each other when the distance between both apparatuses is within several tens of centimeters. The proximity communication includes a type of communication performed such that (housings of) two apparatuses touch each other.

The control module 13 executes a process for realizing a service using the IC card 2. The control module 13 writes and reads data for use in the service on the IC card 2 through the antenna 11 and the RF drive substrate 12, if necessary. In addition, the control module 13 can execute processes for types of services in parallel. Specifically, the reader-writer 1 alone can provide a plurality of services using the IC card 2 of the noncontact type, such as electronic money services, prepaid card services, and ticket card services for various types of transportation.

The main power supply 14 supplies power necessary for the RF drive substrate 12 and the control module 13 to operate.

Figure 2:
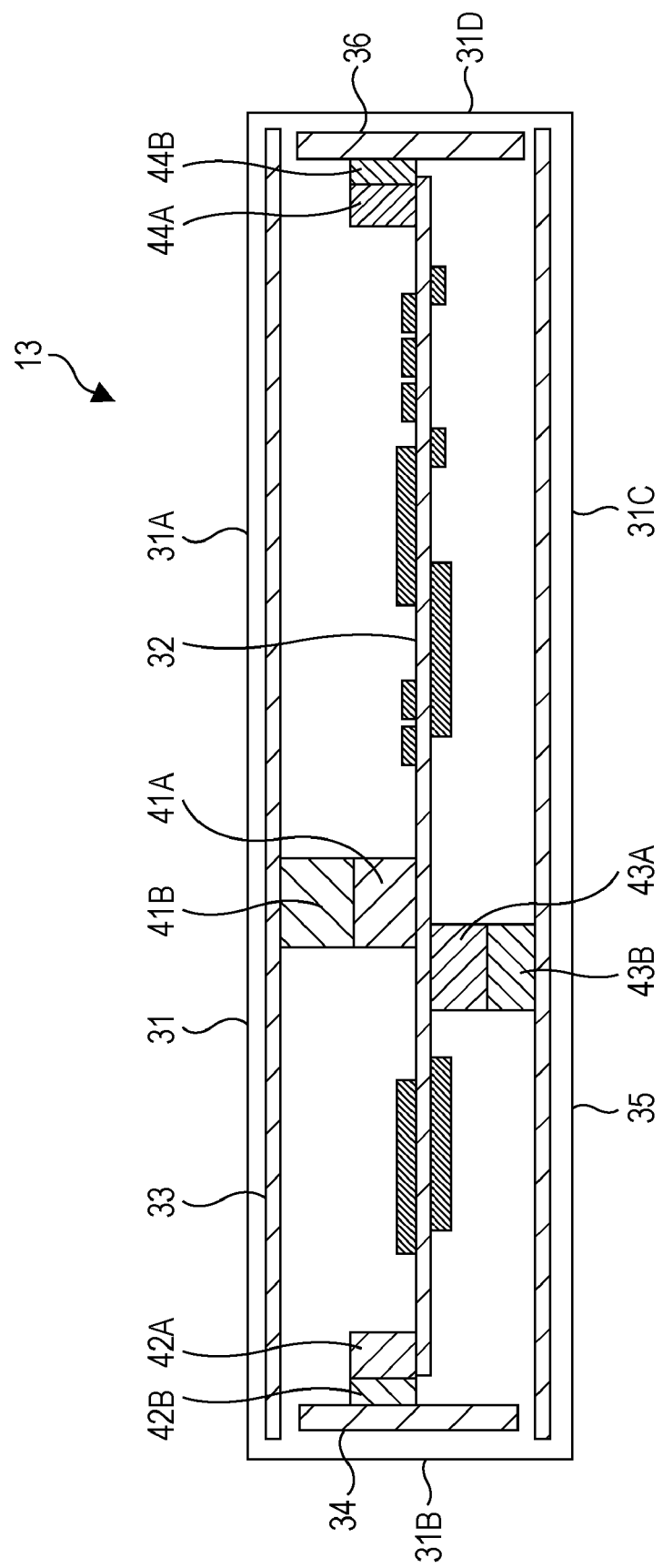
FIG. 2 is a sectional view showing an example of the configuration of the control module shown in FIG. 1.

FIG. 2 is a sectional view showing an example of the configuration of the control module 13.

The control module 13 is formed such that a main substrate 32, and protection substrates 33 to 36 are provided in a rectangular parallelepiped housing 31. The main substrate 32 is provided near substantially a heightwise center of the housing 31. The protection substrates 33 to 36 are substantially identical in shape and area to inner surfaces of faces 31A to 31D of the housing 31. The protection substrates 33 to 36 are fixed to the inner surfaces of the faces 31A to 31D of the housing 31. In addition, similarly to the protection substrates 33 to 36, protection substrates that are substantially identical in shape and area to inner surfaces of the other two faces (not shown) of the housing 31 are fixed also to the inner surfaces of the other two faces of the housing 31. In other words, the protection substrates 33 to 36 and the other two protection substrates, that is, a total of six protection substrates, are disposed covering substantially all the inner surfaces of the housing 31 and surrounding the main substrate 32. Although, in FIG. 2, each inner surface of the control module 13 and each protection substrate have a predetermined gap therebetween, the protection substrate may be disposed in contact with the inner surface of the housing 31.

The main substrate 32 has thereon components for performing processing of the control module 13, which includes a CPU (central processing unit) 101 (FIG. 5) and a RAM 171 (FIG. 5).

The six protection substrates are provided in order to detect tampering actions, such as opening and destruction of the housing 31, performed for unauthorized actions such as intercepting and tampering with data stored in the RAM 171 provided on the main substrate 32, as described later with reference to FIG. 8, etc.

Figure 3:
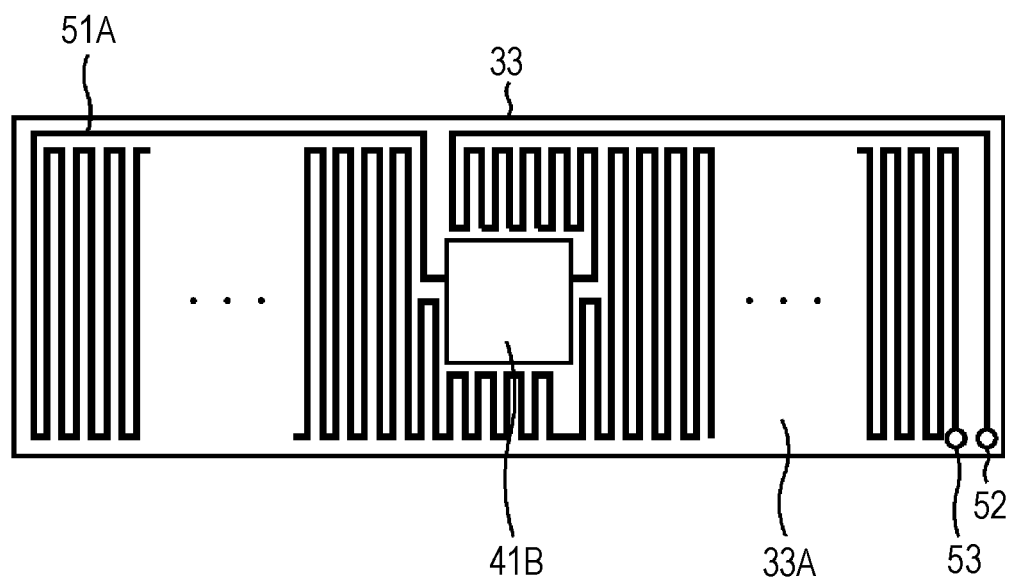
FIG. 3 is an illustration of an example of the configuration of one surface of one protection substrate shown in FIG. 2.
Figure 4:
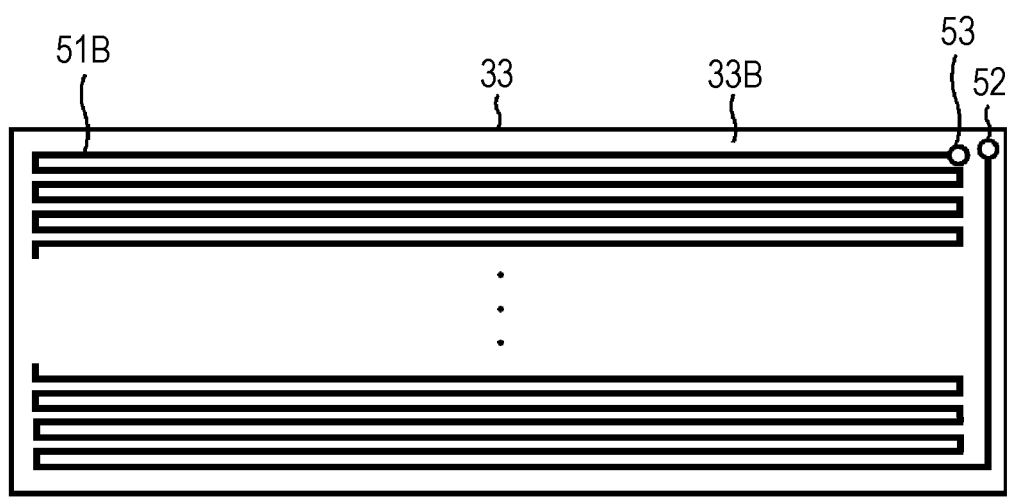
FIG. 4 is an illustration of an example of the configuration of the other surface of one protection substrate shown in FIG. 2.

FIGS. 3 and 4 show examples of the configuration of the protection substrate 33. FIG. 3 shows an example of the configuration of a surface 33A of the protection substrate 33 to the main substrate 32 in FIG. 2. FIG. 4 shows an example of the configuration of a surface 33B of the protection substrate 33 to the housing 31 in FIG. 2.

As described above, the protection substrate 33 is a rectangle substantially identical in size and shape to the inner surface 31A of the housing 31. A connector 41B is provided substantially in the center of the surface 33A of the protection substrate 33. In the area of the surface 33A excluding the connector 41B, a wire 51A that is sufficiently thin for the length or width of the surface 33A is longitudinally routed substantially in parallel to the length of the surface 33A at intervals each being sufficiently narrow for the length or width of the surface 33A, with the wire 51A covering substantially the entirety of the surface 33A. On the surface 33B, a wire 51B that is sufficiently thin for the length or width of the surface 33B is longitudinally routed substantially in parallel to the width of the surface 33B which is perpendicular to the longitudinal direction of the wire 51A on the surface 33A at intervals each being sufficiently narrow for the length or width of the surface 33B, with the wire 51B covering substantially the entirety of the surface 33B. The wires 51A and 51B are connected by through vias 52 and 53 to form a single electric wire. In other words, on substantially the entirety of both surfaces 33A and 33B of the protection substrate 33, a wire is routed in the form of a grid.

In the following, the wires 51A and 51B are generically referred to as the "wire 51", if necessary.

Similarly to the protection substrate 33, regarding the other five substrates other than the protection substrate 33, on substantially the entirety of both surfaces of each substrate, a wire is routed in the form of a grid, which is not shown and not described. That is, a wire that is sufficiently thin for the length or width of each surface of the housing 31 is routed at intervals each being sufficiently narrow for the length or width of the surface of the housing 31, covering substantially the entirety of the surface of the housing 31. Accordingly, when a destructive action occurs, such as drilling a hole in the housing 31, part of the wire covering substantially the entirety of the housing 31 is likely to be disconnected.

On each protection substrate, it is preferable that each wire be thinner as much as possible and it is preferable that the distance between adjacent portions of the wire be narrower as much as possible.

Referring back to FIG. 2, the main substrate 32 and the protection substrate 33 are electrically connected to each other by the connector 41A and 41B. The main substrate 32 and the protection substrate 34 are electrically connected to each other by the connectors 42A and 42B. The main substrate 32 and the protection substrate 35 are electrically connected to each other by connectors 43A and 43B. The main substrate 32 and the protection substrate 36 are electrically connected to each other by connectors 44A and 44B. In addition, the two protection substrates (not shown) are electrically connected to the main substrate 32 by connectors (not shown). In other words, when each face of the housing 31 is opened, the protection substrate fixed to each inner surface of the housing 31 and the main substrate 32 can be electrically disconnected.

The control module 13 includes, not only the above connectors, connectors for electrically connecting the RF drive substrate 12 and the main power supply 14.

FIG. 5 is a block diagram showing a functional configuration of the control module 13 shown in FIG. 1. The control module 13 includes a CPU 101, a memory access controller 102, a storage 103, a reset circuit 104, tamper monitoring circuits 105-1 to 105-6, and a power controller 106. The memory access controller 102 includes a switch 141, a scramble-key-change commanding unit 142, a random number output unit 143, and a bus scramble unit 144. The bus scramble unit 144 includes a scramble key storing section 151 and an address bus scramble circuit 152. The scramble key storing section 151 includes a scramble key buffer 161 and an internal memory 162. The storage 103 includes a RAM 171 and a nonvolatile memory 172.

The CPU 101 and the address bus scramble circuit 152 are interconnected by an address bus 121 having a bus width of n bits. The address bus scramble circuit 152 and the storage 103 are interconnected by an address bus 122 having an n-bit bus width equal to that of the address bus 121. In addition, the CPU 101 and the storage 103 are interconnected by a data bus 123 having a bus width of m bits.

By executing a predetermined program, the CPU 101 executes the process for realizing the service using the IC card 2. In addition, the CPU 101 can execute programs corresponding to services in parallel. In other words, the CPU 101 can execute processes for a plurality of services in parallel.

The CPU 101 writes and reads data for use in each service in the RAM 171 or nonvolatile memory 172 in the storage 103. In the following description, "to write data in the RAM 171 or nonvolatile memory 172 in the storage 103" is simply represented by "to write data in the storage 103", if necessary, and "to read data from the RAM 171 or nonvolatile memory 172 in the storage 103" is simply represented by "to read data from the storage 103", if necessary.

When the CPU 101 writes the data in the storage 103, the CPU 101 uses the address bus 121 to supply the address bus scramble circuit 152 with a logical address signal that represents a logical address representing a logical data-writing location, and uses the data bus 123 to supply the storage 103 with a write signal which includes write data and which represents a data write command. When the CPU 101 reads the data from the storage 103, the CPU 101 uses the address bus 121 to supply the address bus scramble circuit 152 with a logical address signal that represents a logical address representing a logical data-reading location, and uses the data bus 123 to supply the storage 103 with a read signal representing a data read command.

The memory access controller 102 controls accessing of the storage 103 by the CPU 101.

Among components included in the memory access controller 102, the switch 141 is pressed when a user commands changing a scramble key. When being pressed by the user, the switch 141 supplies the scramble-key-change commanding unit 142 with a signal indicating that the switch 141 has been pressed.

When the switch 141 is pressed, the scramble-key-change commanding unit 142 supplies the random number output unit 143 with a scramble key change command. In addition, when the scramble-key-change commanding unit 142 detects a tampering action such as destruction or opening of the housing 31 on the basis of monitoring signals output from the tamper monitoring circuits 105-1 to 105-6, the scramble-key-change commanding unit 142 supplies the scramble key change command to the random number output unit 143.

When the scramble-key-change commanding unit 142 supplies the random number output unit 143 with a signal representing the scramble key change command, the random number output unit 143 generates a pseudo-random number formed by an n-bit string, and outputs the pseudo-random number as a scramble key to the scramble key buffer 161.

The bus scramble unit 144 performs processing for converting a logical address represented by the logical address supplied from the CPU 101 into a physical address to be actually accessed in the storage 103.

Among components included in the bus scramble unit 144, the scramble key storing section 151 stores, as a scramble key, the pseudo-random number supplied from the random number output unit 143. Specifically, the scramble key buffer 161 in the scramble key storing section 151 stores, as the scramble key, the pseudo-random number supplied from the random number output unit 143. In addition, the scramble key buffer 161 also supplies and stores the scramble key in the internal memory 162. The internal memory 162 is formed by a nonvolatile memory such as a flash memory or a RAM backed up by a battery or the like. The internal memory 162 continuously stores the scramble key, even if the main power supply 14 is in an OFF state. In addition, when the main power supply 14 is turned on from the OFF state, the scramble key buffer 161 reads and stores the scramble key stored in the internal memory 162. Until reading of the scramble key from the internal memory 162 is completed after the main power supply 14 is turned on, the scramble key buffer 161 supplies a reset command signal to the reset circuit 104.

By using the scramble key stored in the scramble key buffer 161 to scramble the logical address represented by the logical address signal supplied from the CPU 101, the address bus scramble circuit 152 converts the logical address into a physical address to be actually accessed in the storage 103. In other words, by scrambling an input logical address, the address bus scramble circuit 152 assigns a physical address to the logical address. The address bus scramble circuit 152 supplies the storage 103 with a physical address signal representing the physical address obtained by the conversion.

Among components included in the storage 103, the RAM 171 stores high security data such as data of the services and personal information. The data stored in the RAM 171 is maintained by power from the power controller 106. When supply of the power from the power controller 106 is stopped, the stored data is erased.

The nonvolatile memory 172 is formed by, for example, one of nonvolatile memories such as a flash memory, an EEPROM (electrically erasable and programmable read only memory), an HDD (hard disk drive), an MRAM (magnetoresistive random access memory), an FeRAM (ferroelectric random access memory), and an OUM (ovonic unified memory). The nonvolatile memory 172 stores low security data.

When being supplied with the write signal from the CPU 101, each of the RAM 171 and the nonvolatile memory 172 writes data included in the write signal at a physical address in each of the RAM 171 and the nonvolatile memory 172 which is represented by a physical address signal supplied from the address bus scramble circuit 152. In addition, when being supplied with the read signal from the CPU 101, each of the RAM 171 and the nonvolatile memory 172 reads data at a physical address in each of the RAM 171 and the nonvolatile memory 172 which is represented by a physical address signal supplied from the address bus scramble circuit 152, and supplies the read data to the CPU 101 through the data bus 123.

While the reset command signal is being supplied from the scramble key buffer 161 to the reset circuit 104, the reset circuit 104 initializes the state of the CPU 101 by supplying a reset signal to the CPU 101.

Each of the tamper monitoring circuits 105-1 to 105-6 monitors a tampering action such as destruction or opening of the housing 31, and supplies a monitoring signal representing a monitoring result to the power controller 106 and the scramble-key-change commanding unit 142, as described later with reference to FIG. 8, etc.

When it is not necessary to distinguish each of the tamper monitoring circuits 105-1 to 105-6, each tamper monitoring circuit is hereinafter referred to as the "tamper monitoring circuit 105".

The power controller 106 is supplied with power from the main power supply 14, and controls supply of power to each portion of the control module 13, as described later with reference to FIG. 10, etc. When a tampering action on the control module 13 is detected, the power controller 106 stops supply of power to the storage 103, whereby the data in the RAM 171 is erased.

Figure 6:
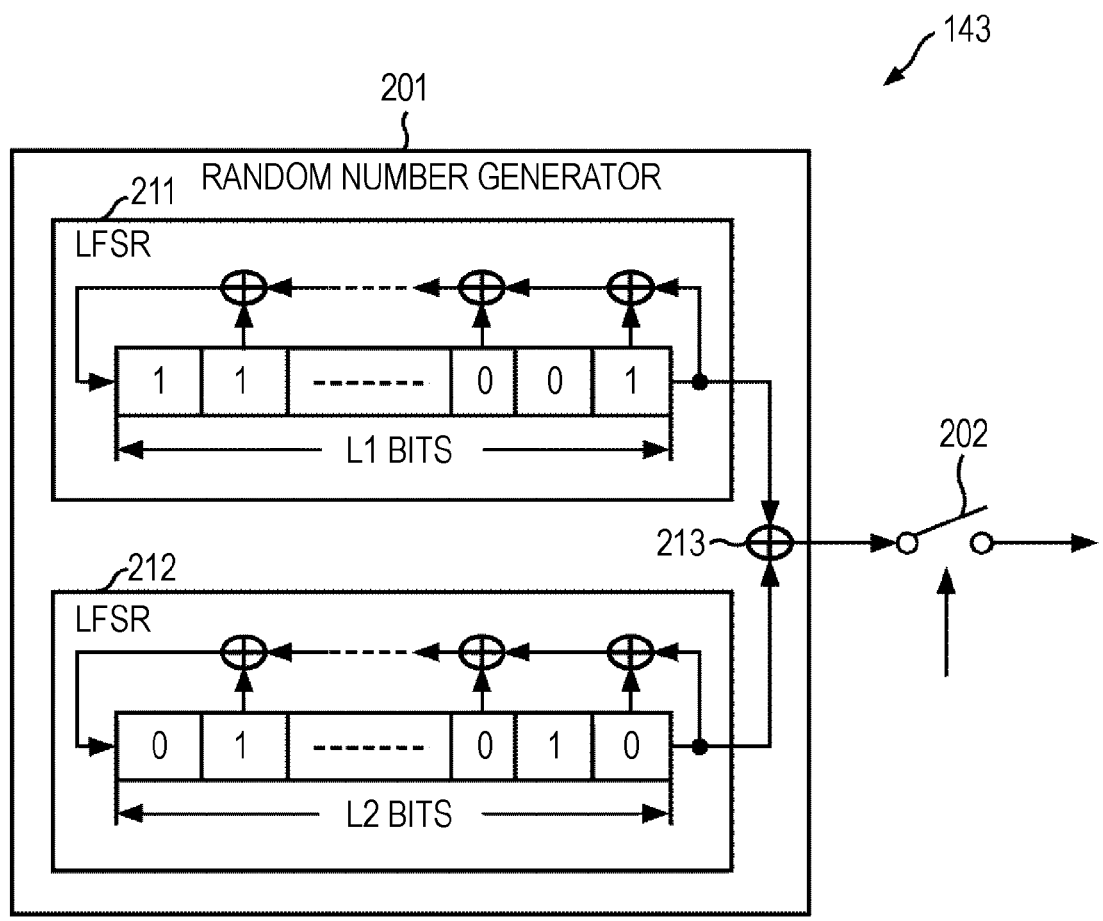
FIG. 6 is a block diagram showing a functional configuration of the random number output unit shown in FIG. 5.

FIG. 6 is a block diagram showing a functional configuration of the random number output unit 143. The random number output unit 143 includes a random number generator 201 and a switch 202.

The random number generator 201 includes an LFSR (linear feedback shift register) random number output unit 211 including a shift register having L1 bits, an LFSR random number output unit 212 including a shift register having L2 bits, and an EXOR (exclusive OR) circuit 213.

The LFSR random number output units 211 and 212 are based on the known LFSR principle in which an exclusive logical sum having a value represented by predetermined bits in a shift register is input as a feedback value to the shift register. The random number generator 201 generates a Gold-sequence random number by using the EXOR circuit 213 to obtain, for each bit, an exclusive logical sum of two different M-sequence pseudo-random numbers generated by the LFSR random generating units 211 and 212. The number of LFSR random number output units included in the random number generator 201 is not limited to two, but may be three or greater.

When an input signal representing a scramble-key-change command is received from the scramble-key-change commanding unit 142, the switch 202 is turned on, whereby the bit string representing the Gold-sequence random number generated by the random number generator 201 is output to the scramble key buffer 161 through the switch 202.

Figure 7:
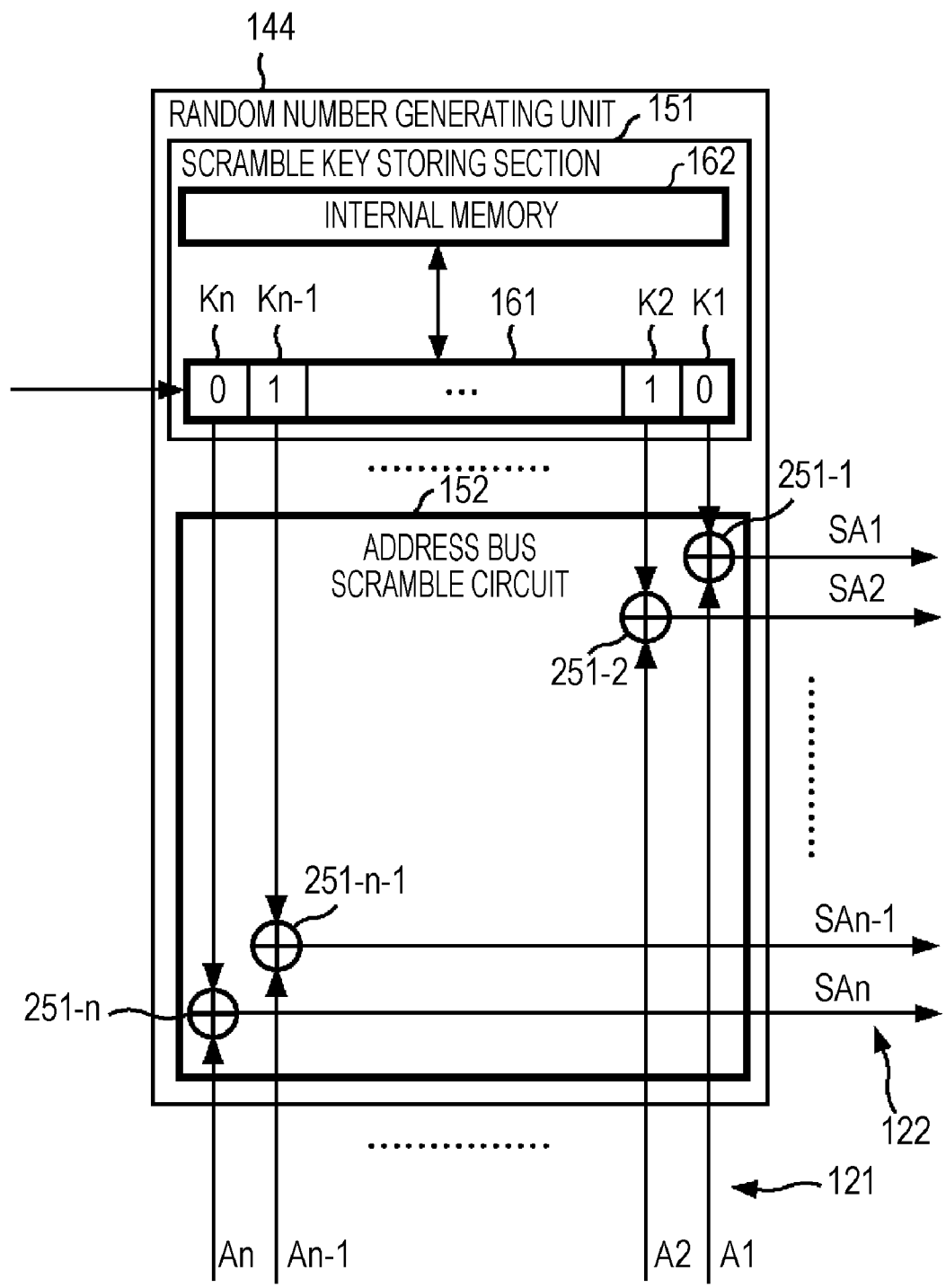
FIG. 7 is a detailed block diagram showing a functional configuration of the bus scramble unit shown in FIG. 5.

FIG. 7 is a detailed block diagram showing a functional configuration of the bus scramble unit 144.

The scramble key buffer 161 includes a serial-input and parallel-output shift register having n bits. In the scramble key buffer 161, the pseudo-random number supplied as a serial signal from the random number output unit 143 is stored as a scramble key.

The address bus scramble circuit 152 converts a logical address into an n-bit physical address having bits SA1 to SAn by using EXOR circuits 251-1 to 251-$n$ to obtain an exclusive logical sum between each bit of the n-bit logical address which has bits A1 to An and which is represented by the logical address signal supplied from the CPU 101 through the address bus 121, and each bit of an n-bit scramble key which has bits K1 to Kn and which is stored in the scramble key buffer 161. The address bus scramble circuit 152 uses the address bus 122 to supply the storage 103 with a physical address signal representing the physical address obtained by the conversion.

Figure 8:
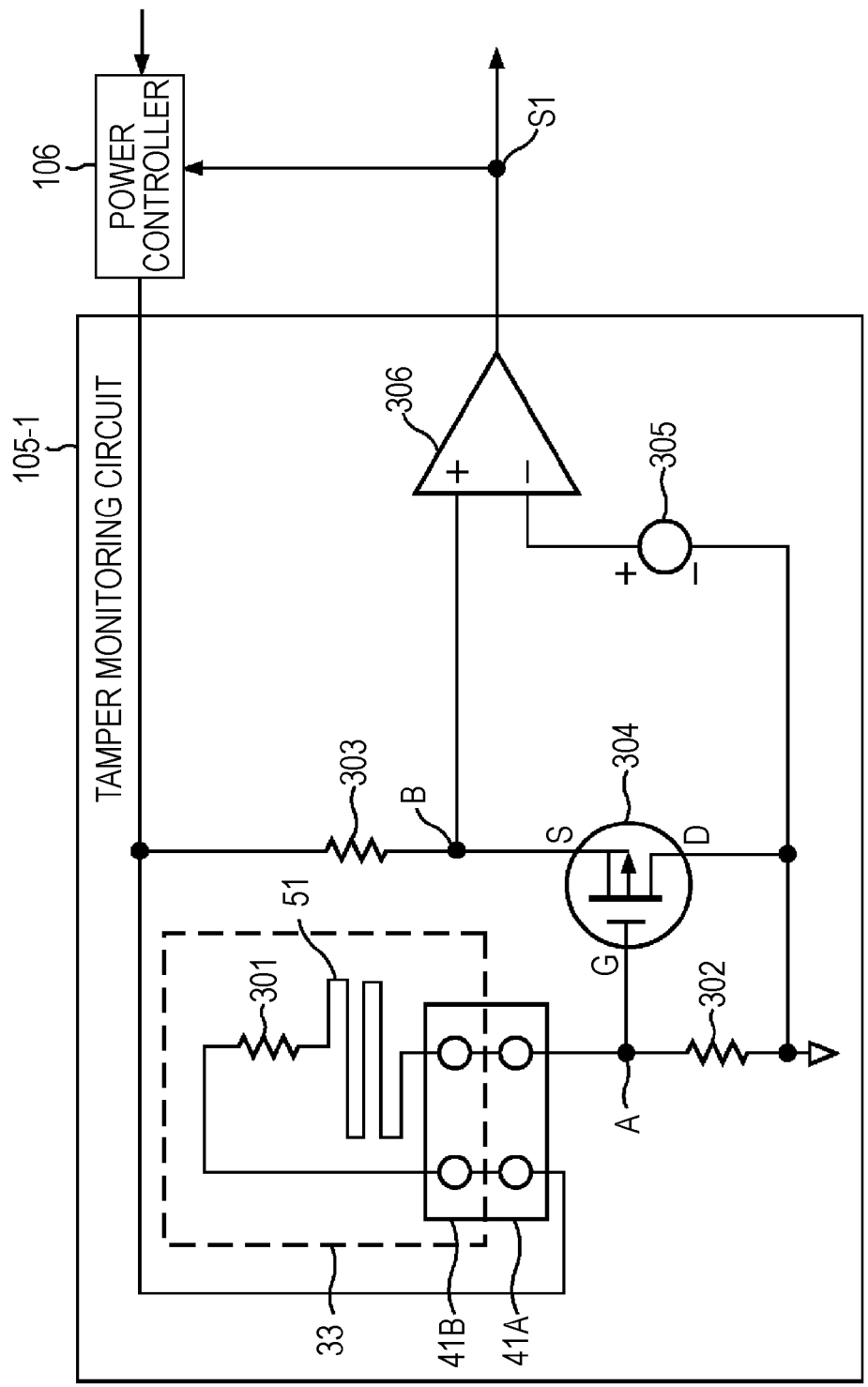
FIG. 8 is a circuit diagram showing an example of the configuration of one tamper monitoring circuit shown in FIG. 5.

FIG. 8 is a circuit diagram showing an example of the tamper monitoring circuit 105-1 shown in FIG. 5. The tamper monitoring circuit 105-1 includes, on the protection substrate 33, the wire 51, resistors 301, 302, and 303, a p-type MOSFET (metal oxide semiconductor field effect transistor) 304, a comparison voltage supply element 305, and a voltage comparator 306.

A gate of the MOSFET 304 is connected to one end of the resistor 301 via point A, the connectors 41A and 41B, and the wire 51, and is connected to one end of the resistor 302 via point A. A source of the MOSFET 304 is connected to one end of the resistor 303 and a positive terminal of the voltage comparator 306 via point B. A drain of the MOSFET 304 is connected to the other end of the resistor 302 which differs from the end connected to the gate of the MOSFET 304. The drain of the MOSFET 304 is also connected to a negative terminal of the comparison voltage supply element 305 and is grounded. In other words, the tamper monitoring circuit 105-1 is formed by a source follower circuit in which the drain of the MOSFET 304 is grounded.

The other end of the resistor 301 which differs from the end connected to the wire 51 is connected to the other end of the power controller 106 and resistor 303 which differs from the end connected to point B via the connectors 41B and 41A. The positive terminal of the comparison voltage supply element 305 is connected to the negative terminal of the voltage comparator 306. An output terminal of the voltage comparator 306 is connected to the power controller 106 and scramble-key-change commanding unit 142 shown in FIG. 5 via point S1.

The resistance of the resistor 302 is sufficiently greater than that of the resistor 301. Accordingly, a voltage at point A, that is, the gate terminal of the MOSFET 304, is raised to a voltage that is substantially equal to an input voltage from the power controller 106, and the source voltage of the MOSFET 304 follows so as to be substantially equal to the gate voltage. Thus, points A and B have substantially equal voltages. Therefore, a voltage that is substantially equal to the input voltage from the power controller 106 is input to the positive voltage of the voltage comparator 306. The comparison voltage supply element 305 inputs, to the negative terminal of the voltage comparator 306, a voltage approximately half the input voltage from the power controller 106. When the voltage input to the positive terminal of the voltage comparator 306 is higher than that input to the negative terminal of the voltage comparator 306, the voltage of the monitoring signal output from the voltage comparator 306 is a value obtained by amplifying a voltage difference between the positive and negative terminals of the voltage comparator 306. When the voltage input to the negative terminal of the voltage comparator 306 is higher than that input to the positive terminal of the voltage comparator 306, the voltage of the monitoring signal output from the voltage comparator 306 is approximately zero volts.

Figure 9:
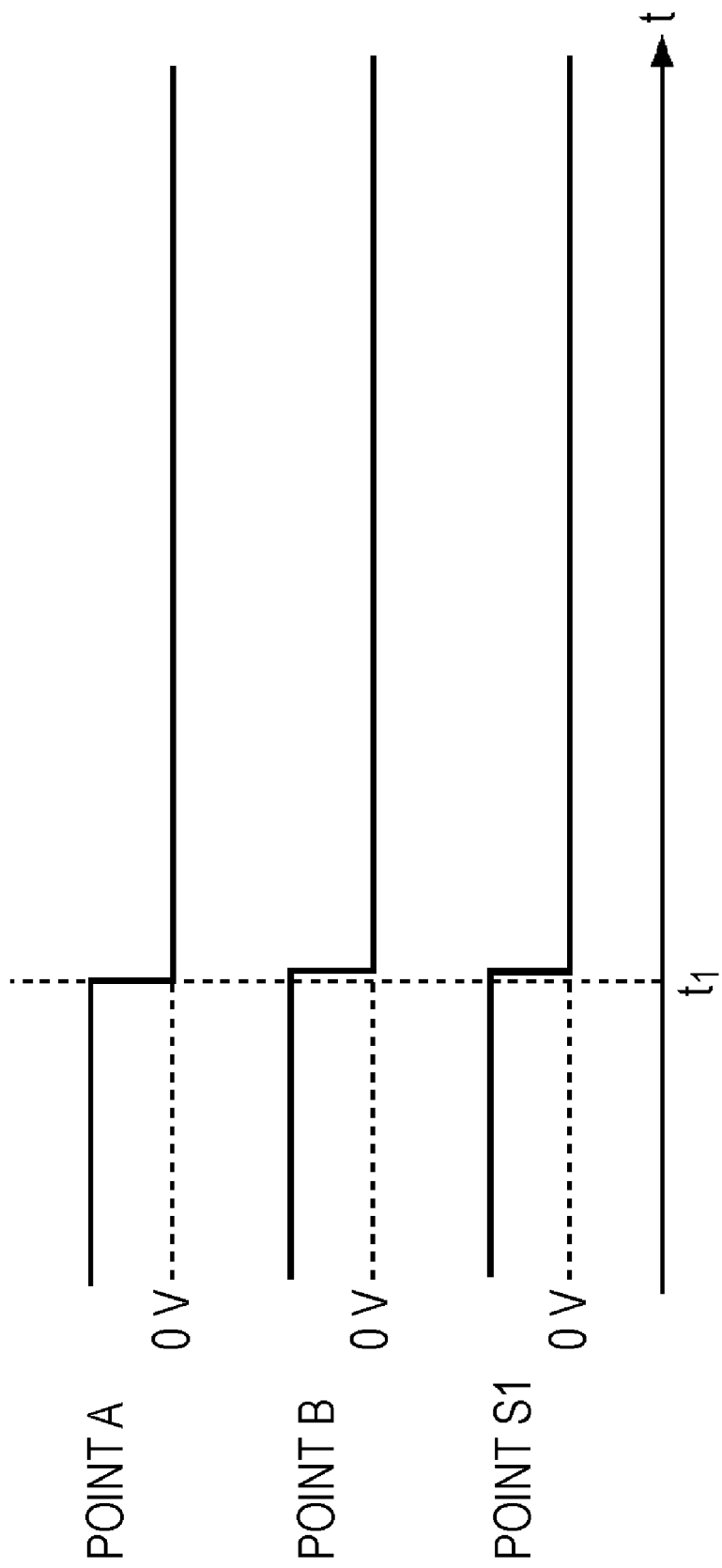
FIG. 9 is a timing chart illustrating an example of an operation of one tamper monitoring circuit shown in FIG. 5.

Referring to FIG. 9, an example of an operation of the tamper monitoring circuit 105-1 is described below. FIG. 9 shows examples of changes in voltage at points A, B, and S1 when a tampering action, such as opening or destruction, is performed on the face 31A of the housing 31 of the control module 13. In FIG. 9, time $t_1$ represents a time that the tampering action is performed.

In a state prior to time $t_1$ in which no abnormality occurs, as described above, each of the voltages at points A and B is approximately equal to the input voltage from the power controller 106. Accordingly, the voltage at the positive terminal of the voltage comparator 306, that is, the voltage at point B, is higher than the voltage at the negative terminal of the voltage comparator 306, that is, the voltage of the comparison voltage supply element 305. Thus, the output voltage of the voltage comparator 306, that is, the voltage at point S1, is a positive value obtained by amplifying a voltage difference between the positive and negative terminals of the voltage comparator 306.

In cases such as, at time $t_1$, when the face 31A of the housing 31 of the control module 13 is opened to separate the connectors 41A and 41B, and when a destructive action, such as drilling a hole in the face 31A, is performed to cause a disconnection in the wire 51, a disconnection occurs between the power controller 106 and the MOSFET 304, so that point A has a voltage of zero volts. As shown in FIG. 9, point B accordingly has a voltage of approximately zero volts, and the voltage at the negative terminal of the voltage comparator 306 is higher than that at the positive terminal of the voltage comparator 306. Thus, the output voltage of the voltage comparator 306, that is, the voltage at point S1, is approximately zero volts.

Therefore, on the basis of the monitoring signal output from the tamper monitoring circuit 105-1, a tampering action, such as opening or destruction of the housing 31, can be detected.

The tamper monitoring circuits 105-2 to 105-6 are also identical in configuration to the tamper monitoring circuit 105-1. Accordingly, the tamper monitoring circuits 105-2 to 105-6 are not described since their descriptions are repetitions. Similarly to the tamper monitoring circuit 105-1, on the basis of a monitoring signal from each of the tamper monitoring circuits 105-2 to 105-6, a tampering action, such as opening or destruction of the housing 31, can be detected.

Therefore, by monitoring the monitoring signals from the tamper monitoring circuits 105-1 to 105-6, detection of tampering actions, such as opening or destruction, on all the faces of the housing 31 can be ensured.

In the following description, the tamper monitoring circuit 105-2 includes a wire on the protection substrate 34. The tamper monitoring circuit 105-3 includes a wire on the protection substrate 35. The tamper monitoring circuit 105-4 includes a wire on the protection substrate 35. The tamper monitoring circuits 105-5 and 105-6 include wires on protection substrates corresponding to two faces (not shown) of the housing 31.

FIG. 10 is a circuit diagram showing an example of the configuration of the power controller 106 shown in FIG. 5. The power controller 106 includes a battery 351 that is a backup power supply for the main power supply 14, a battery socket 352, diodes 353 and 354, a capacitor 355, a power regulator 356, a resistor 357, a battery voltage detector 358, and a switch 359.

The battery 351 is installed in the battery socket 352. In this state, the cathode of the battery 351 is connected to the anode of the diode 353 for backflow prevention, one end of the resistor 357, and an input terminal T11 of the battery voltage detector 358. The anode of the battery 351 is connected to one end of the capacitor 355 and the other end of the resistor 357 which differs from the end connected to the cathode of the battery 351, and is grounded. The cathode of the diode 353 is connected to the cathode of the diode 354 for backflow prevention, the other end of the capacitor 355 which differs from the end connected to the anode of the battery 351, and the input terminal T1 of the power regulator 356. The anode of the diode 354 is connected to the main power supply 14.

An output terminal T2 of the power regulator 356 is connected to a power supply terminal T13 of the battery voltage detector 358, one end of the switch 359, the CPU 101, the memory access controller 102, the reset circuit 104, and the tamper monitoring circuits 105-1 to 105-6. An output terminal T12 of the battery voltage detector 358 is connected to a voltage detection terminal (not shown) of the switch 359. The other end of the switch 359 which differs from the end connected to the output terminal T2 of the power regulator 356 is connected to the storage 103. In addition, the voltage detection terminal (not shown) of the switch 359 is connected to the tamper monitoring circuits 105-1 to 105-6 via points S1 to S6.

The power regulator 356 outputs a substantially constant voltage from the output terminal T2 by converting, into a predetermined voltage, a voltage input from the main power supply 14 through the diode 354, or a voltage input from the battery 351 through the diode 353. The voltage output from the output terminal T2 is supplied to the storage 103 via the CPU 101, the memory access controller 102, the reset circuit 104, the tamper monitoring circuits 105-1 to 105-6, the battery voltage detector 358, and the switch 359. In other words, power from the main power supply 14 or the battery 351 is stabilized in voltage by the power regulator 356, and the power stabilized in voltage is supplied to the memory access controller 102, the reset circuit 104, the tamper monitoring circuits 105-1 to 105-6, the battery voltage detector 358, and the storage 103. Accordingly, even if supply of the power from one of the main power supply 14 and the battery 351 is stopped, the stabilized power is supplied to the CPU 101, the memory access controller 102, the reset circuit 104, the tamper monitoring circuits 105-1 to 105-6, the battery voltage detector 358, and the storage 103.

In addition, the main power supply 14 or the battery 351 charges the capacitor 355 to have a predetermined voltage while the capacitor 355 is being supplied with the power by the main power supply 14 or the battery 351. When the supply of the power from the main power supply 14 or the battery 351 is stopped, the power stored in the capacitor 355 is supplied to the storage 103 via the power regulator 356, the CPU 101, the memory access controller 102, the reset circuit 104, the tamper monitoring circuits 105-1 to 105-6, the battery voltage detector 358, and the switch 359. The capacitor 355 is formed by, for example, a super-capacitor (electric double layer capacitor). The capacitor 355 has charge capacity capable of supplying power for at least a predetermined time (e.g., 30 to 40 minutes) to the CPU 101, the memory access controller 102, the reset circuit 104, the tamper monitoring circuits 105-1 to 105-6, the battery voltage detector 358, and the storage 103.

The battery voltage detector 358 detects removal of the battery 351 by detecting the voltage input to the input terminal T11, that is, the voltage applied to the resistor 357 by the battery 351. When the voltage at the input terminal T11 is equal to or less than a predetermined threshold value, the battery voltage detector 358 initiates time measurement by using an internal counter (not shown). When a state in which the voltage at the input terminal T11 is equal to or less than the threshold value continues, the voltage at the output terminal T12 is changed from a high level (for example, 5 volts) to a low level (for example, 0 volts).

When any one of the voltages of the monitoring signals from the tamper monitoring circuits 105-1 to 105-6 and the output signal from the battery voltage detector 358 is equal to or less than a predetermined threshold value, the switch 359 is turned off to stop supply of the power from the power controller 106 to the storage 103.

Figure 11:
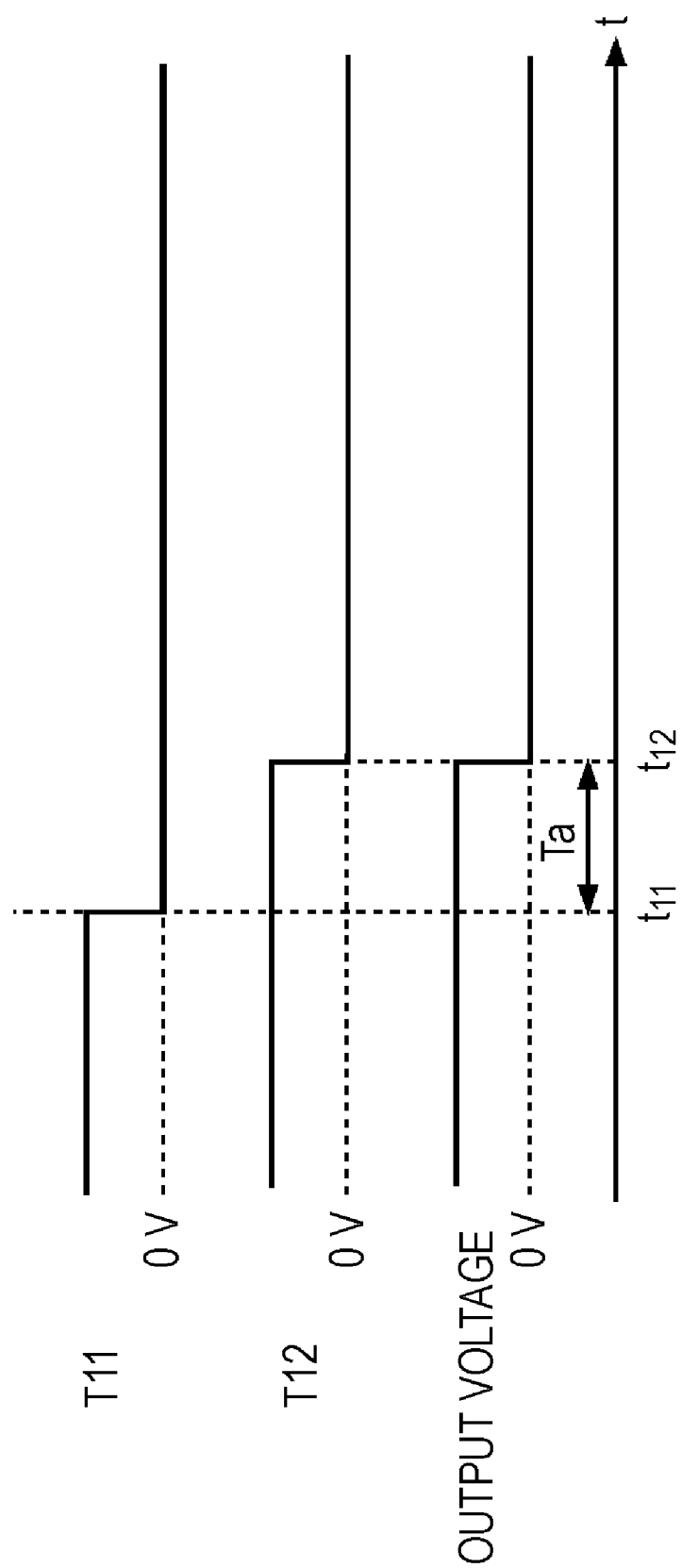
FIG. 11 is a timing chart illustrating an example of an operation of the power controller shown in FIG. 5.

Referring to FIG. 11, an example of the power controller 106 is described below. FIG. 11 shows examples of changes in output voltage from the terminals T11 and T12 of the battery voltage detector 358 and the power controller 106 to the storage 103 in a case in which, in a state in which the main power supply 14 is in an OFF state and no tampering action is detected by the tamper monitoring circuits 105-1 to 105-6, the battery 351 is removed from the battery socket 352. In FIG. 11, time $t_{11}$ represents a time that the battery 351 is removed from the battery socket 352.

In a state prior to time $t_{11}$ in which the battery 351 is installed in the battery socket 352, the battery 351 inputs a positive voltage to the input terminal T11 of the battery voltage detector 358 and the output terminal T12 of the battery voltage detector 358 inputs a high level voltage to the switch 359. In addition, the switch 359 is turned on since no tampering action is detected by the tamper monitoring circuits 105-1 to 105-6 and positive voltages are input to the switch 359 by the tamper monitoring circuits 105-1 to 105-6. This supplies the power output from the output terminal T2 of the power regulator 356 to the storage 103 via the switch 359. At this time, the power output from the output terminal T2 of the power regulator 356 is supplied also to the CPU 101, the memory access controller 102, the reset circuit 104, the tamper monitoring circuits 105-1 to 105-6, and the battery voltage detector 358.

When the battery 351 is removed from the battery socket 352 at time $t_{11}$, the voltage input to the input terminal T11 of the battery voltage detector 358 is approximately zero volts, and the battery voltage detector 358 initiates time measurement by using the internal counter. In addition, the capacitor 355 initiates discharging, so that the power stored in the capacitor 355 is supplied to the CPU 101, the memory access controller 102, the reset circuit 104, the tamper monitoring circuits 105-1 to 105-6, and the battery voltage detector 358 via the power regulator 356.

At time $t_{12}$ at which predetermined time Ta has elapsed after the battery voltage detector 358 initiates time measurement, the battery voltage detector 358 changes the voltage of the output terminal T12 from the high level to the low level. This turns off the switch 359 to stop the supply of the power to the storage 103, whereby the data stored in the RAM 171 in the storage 103 is erased.

Also after time $t_{12}$, the power is continuously supplied from the capacitor 355 to the CPU 101, the memory access controller 102, the reset circuit 104, the tamper monitoring circuits 105-1 to 105-6, and the battery voltage detector 358 via the power regulator 356. Accordingly, even if the battery 351 is removed, monitoring of the tampering action by the tamper monitoring circuits 105-1 to 105-6 is continuously performed.

The battery 351 is connected to the battery 351 during time Ta. When the voltage input to the output terminal T11 exceeds a predetermined threshold value, the time measurement by the internal counter is stopped. Accordingly, by appropriately setting time Ta, the battery 351 can be replaced without erasing the data in the RAM 171, even if the main power supply 14 is in the OFF state. When it is not necessary to consider replacement of the battery 351, at time $t_{11}$, the switch 359 may be turned off.

Figure 12:
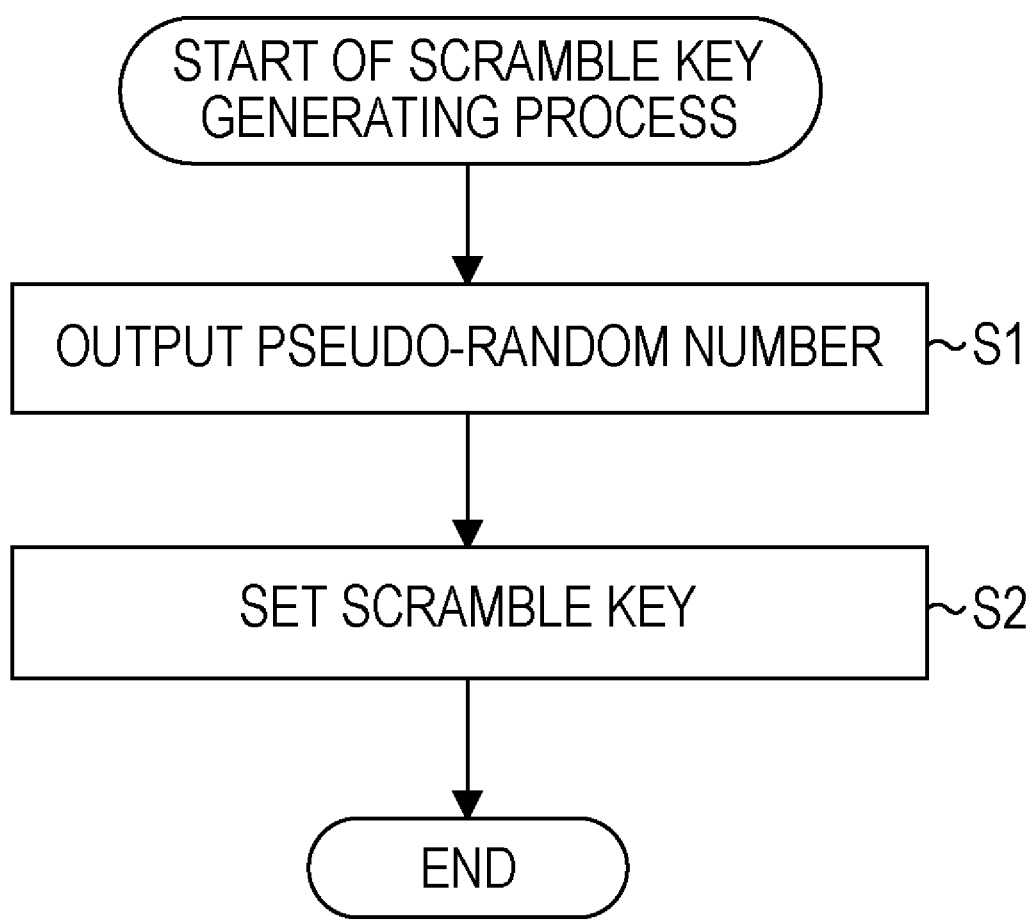
FIG. 12 is a flowchart illustrating a scramble key generating process that is executed by the reader-writer shown in FIG. 1.
Figure 13:
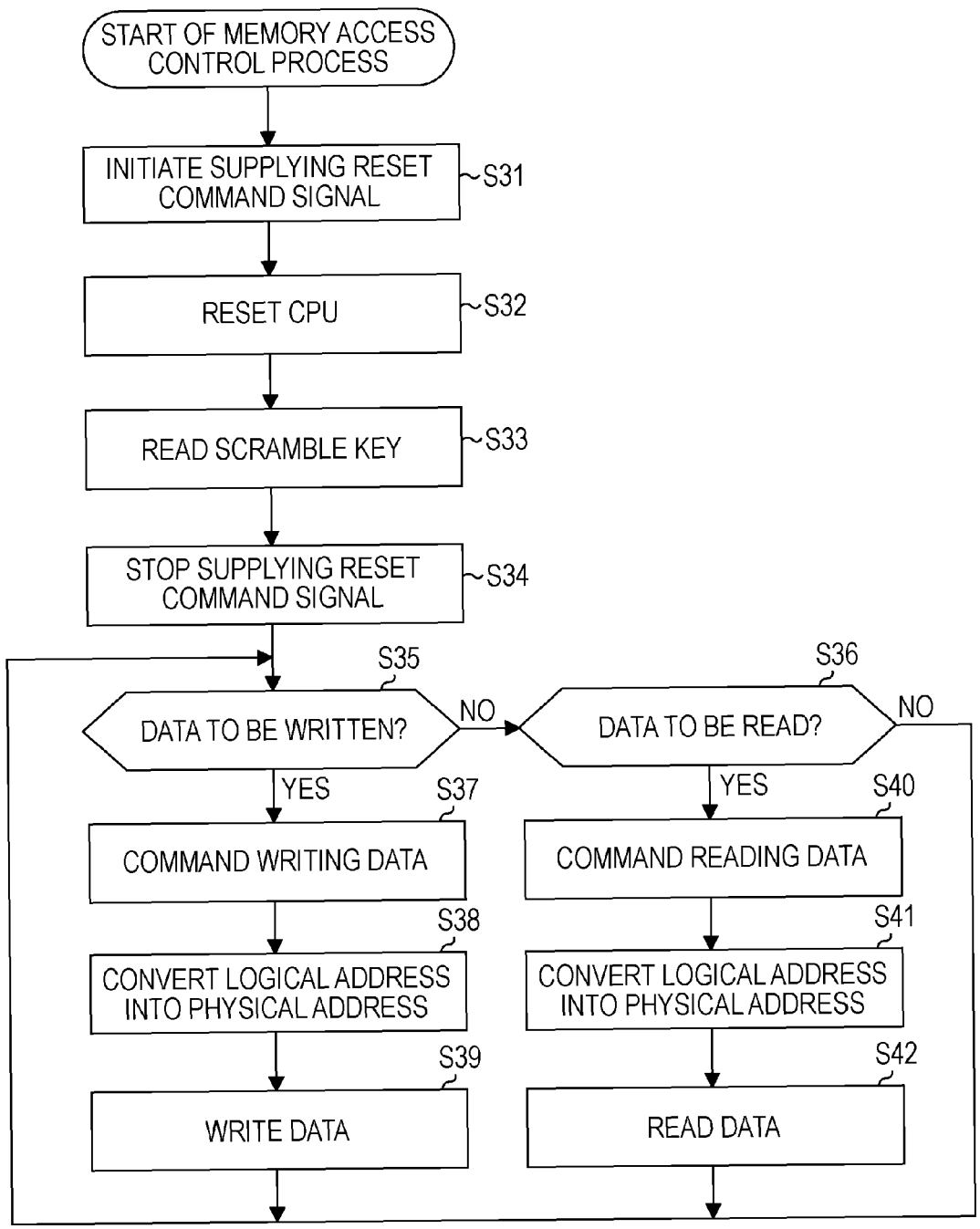
FIG. 13 is a flowchart illustrating a memory access control process that is executed by the reader-writer shown in FIG. 1.
Figure 14:
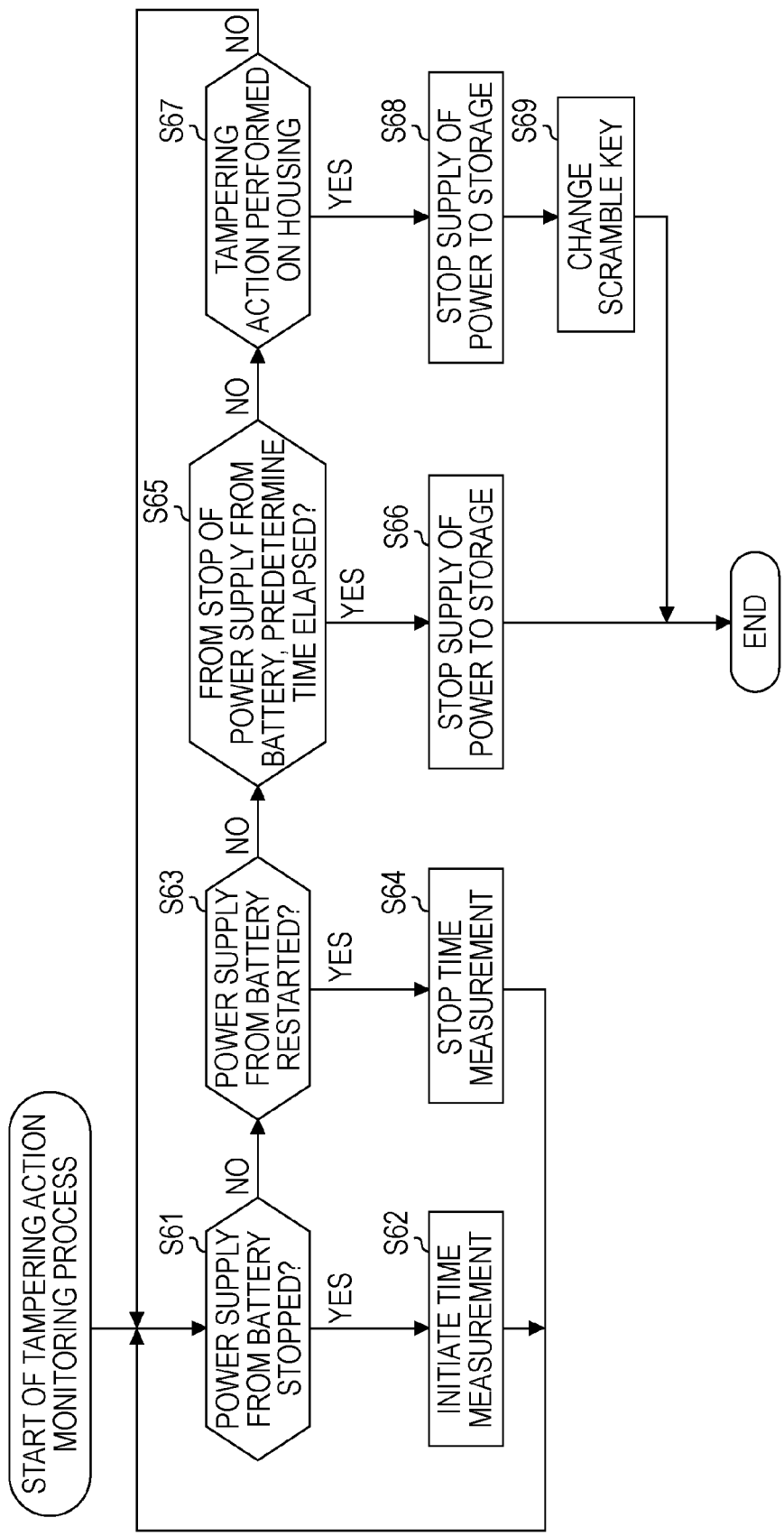
FIG. 14 is a flowchart illustrating a tampering action monitoring process that is executed by the reader-writer shown in FIG. 1.

Next, a process of the reader-writer 1 is described below with reference to FIGS. 12 to 14.

First, a scramble key generating process that is executed by the reader-writer 1 is described below with reference to the flowchart shown in FIG. 12. The scramble key generating process is started, for example, when the user presses the switch 141.

In step S1, the random number output unit 143 outputs a pseudo-random number. Specifically, the switch 141 supplies the scramble-key-change commanding unit 142 with a signal indicating that the switch 141 has been pressed. The scramble-key-change commanding unit 142 turns on the switch 202 by supplying the switch 202 with a signal representing the scramble-key-change command. The random number generator 201 continuously generates pseudo-random numbers while the main power supply 14 of the reader-writer 1 is in an ON state. Turning on of the switch 202 initiates output of the pseudo-random number from the random number generator 201 to the scramble key buffer 161 through the switch 202. When the pseudo-random number is output for n bits from the random number generator 201, the switch 202 is turned off.

In step S2, the bus scramble unit 144 sets the scramble key. After that, the scramble key generating process finishes. Specifically, in the scramble key buffer 161, the pseudo-random number, formed by an n-bit string and supplied from the random number output unit 143, is stored as a scramble key in an internal register. The scramble key buffer 161 supplies and stores the scramble key in the internal memory 162. In other words, the scramble key is backed up by the internal memory 162.

This makes it possible to set, for each control module 13 when the number of reader-writers 1 is plural, a scramble key which has a different value and whose prediction is difficult. The scramble key generating process is performed, for example, before the reader-writer 1 is shipped from a factory.

Next, a memory access control process that is executed by the reader-writer 1 is described below with reference to the flowchart shown in FIG. 13. The memory access control process is started, for example, when the main power supply 14 of the reader-writer 1 is turned on.

In step S31, the main power supply 14 of the reader-writer 1 is turned on, whereby the scramble key buffer 161 initiates supplying a reset command signal to the reset circuit 104.

In step S32, the reset circuit 104 resets the CPU 101 by supplying a reset signal to the CPU 101. This initializes the state of the CPU 101.

In step S33, the scramble key buffer 161 reads the scramble key stored in the internal memory 162. The scramble key buffer 161 stores the read scramble key in the internal register.

In step S34, the scramble key buffer 161 stops supplying the reset command signal to the reset circuit 104. The reset circuit 104 accordingly stops supplying the reset signal, and the CPU 101 initiates program execution.

In step S35, the CPU 101 determines whether to write data. If, in the program being executed, data writing is not performed in the next step, the CPU 101 determines not to write the data, and the process proceeds to step S36.

In step S36, the CPU 101 determines whether to read data. If, in the program being executed, data reading is not performed in the next step, the CPU 101 determines not to read the data, and the process returns to step S35.

After that, until the CPU 101 determines to write the data in step S35 or determines to read the data in step S36, steps S35 and S35 are repeatedly executed.

If, in the program being executed, data writing is performed in the next step, in step S35, the CPU 101 determines to write the data, and the process proceeds to step S37.

In step S37, the CPU 101 commands writing the data. Specifically, the CPU 101 uses the address bus 121 to supply the address bus scramble circuit 152 with a logical address signal representing a logical data-writing location. The CPU 101 also uses the data bus 123 to supply the storage 103 with a signal which includes write data and which represents a data writing command.

In step S38, the address bus scramble circuit 152 converts the logical address into a physical address. Specifically, the address bus scramble circuit 152 converts the logical address into a physical address by obtaining an exclusive logical sum between each bit of the logical address represented by the logical address signal and each bit of the scramble key stored in the scramble key buffer 161, and scrambling the logical address. The address bus scramble circuit 152 uses the address bus 122 to supply the storage 103 with a physical address signal representing the physical address obtained by conversion.

In step S39, the storage 103 writes the data. Specifically, in the RAM 171 or the nonvolatile memory 172, the data included in the write signal supplied from the CPU 101 is written at a physical address in the RAM 171 or the nonvolatile memory 172 which is represented by the physical address signal. Accordingly, even if the CPU 101 commands writing the data at consecutive logical address, actually, the data is written in the RAM 171 or the nonvolatile memory 172 so as to be allocated at random. Thus, analyzing and tampering with the content of the data stored in the RAM 171 or the nonvolatile memory 172 can be made difficult.

After that, the process returns to step S35, and step S35 and the subsequent steps are executed.

If, in the program being executed, data reading is performed in the next step, in step S36, the CPU 101 determines to read the data, and the process proceeds to step S40.

In step S40, the CPU 101 commands reading the data. Specifically, the CPU 101 uses the address bus 121 to supply the address bus scramble circuit 152 with a logical address signal representing a logical data-reading location. The CPU 101 also uses the data bus 123 to supply the storage 103 with a read signal representing a data reading command.

Similarly to step S38, in step S41, the logical address is converted into a physical address. A physical address signal representing the physical address obtained by conversion is supplied from the address bus scramble circuit 152 to the storage 103 via the address bus 122.

In step S42, the storage 103 reads the data. Specifically, the RAM 171 or the nonvolatile memory 172 reads data stored at the physical address represented by the physical address signal, and uses the data bus 123 to supply the read data to the CPU 101.

After that, the process proceeds to step S35, and step S35 and the subsequent steps are executed.

As described above, a different scramble key for each control module 13 when the number of reader-writers 1 is plural can easily be set. Even if a scramble key set for one control module 13 is analyzed, it is difficult to use the scramble key to analyze and tamper with the data stored in the RAM 171 or nonvolatile memory 172 of a different control module 13. Therefore, damage based on distribution of and tampering with data can be minimized.

In addition, regarding a method for generating the pseudo-random number and a method for scrambling the address, the related art may be used without being modified, and it is not necessary to provide a new complex circuit. Accordingly, no effort of the user is necessary except for inputting a scramble-key-change command. Thus, security of data stored in the RAM 171 and the nonvolatile memory 172 can be easily improved.

Next, a tampering action monitoring process that is executed by the reader-writer 1 is described below with reference to the flowchart shown in FIG. 14. The tampering action monitoring process is started, for example, when use of the reader-writer 1 is initiated after the reader-writer 1 is shipped from a factory.

In step S61, the battery voltage detector 358 determines whether supply of the power from the battery 351 has been stopped. As described above with reference to FIGS. 10 and 11, when the voltage at the input terminal T11 changes from a state exceeding the predetermined threshold value to a value equal to or less than the predetermined threshold value since, for example, the battery 351 is removed from the battery socket 352, the battery voltage detector 358 determines that the supply of the power from the battery 351 has been stopped, and the process proceeds to step S62.

In step S62, the battery voltage detector 358 initiates time measurement by using the internal counter (not shown).

After that, the process returns to step S61, and step S61 and the subsequent steps are executed.

If, in step S61, the voltage at the input terminal T11 exceeds the threshold value, or continues to be equal to or less than the threshold value, the battery voltage detector 358 determines that the power is supplied from the battery 351, or that a state in which the supply of the power from the battery 351 has been stopped continues, and the process proceeds to step S63.

In step S63, the battery voltage detector 358 determines whether the supply of the power from the battery 351 has been restarted. Specifically, when the voltage at the input terminal T11 changes from the value equal to or less than the threshold value to the value exceeding the threshold value, the battery voltage detector 358 determines that the supply of the power from the battery 351 has been restarted, and the process proceeds to step S64.

In step S64, the battery voltage detector 358 stops the time measurement using the internal counter (not shown).

After that, the process returns to step S61, and step S61 and the subsequent steps are executed.

When the voltage at the input terminal T11 continues to be greater than the threshold value, or continues to be equal to or less than the threshold value, in step S63, the battery voltage detector 358 determines that the state in which the power is supplied from the battery 351 continues, or that the state in which the supply of the power from the battery 351 has been stopped continues, and the process proceeds to S65.

In step S65, the battery voltage detector 358 determines whether a predetermined time has elapsed after stopping the supply of the power from the battery 351. When the value of the internal counter represents the predetermined time or greater, the battery voltage detector 358 determines that the predetermined time has elapsed after stopping the supply of the power from the battery 351, and the process proceeds to step S66.

In step S66, the power controller 106 stops the supply of the power to the storage 103, whereby the tampering acting monitoring process finishes. Specifically, the battery voltage detector 358 changes the voltage at the output terminal T12 from the high level to the low level. This turns off the switch 359 to stop the supply of the power from the power regulator 356 to the storage 103, whereby the data stored in the RAM 171 of the storage 103 is erased.

When the value of the internal counter (not shown) represents a value less than the predetermined time, in step S65, the battery voltage detector 358 determines that the predetermined time has not elapsed yet after stopping the supply of the power from the battery 351, or that the supply of the power from the battery 351 has not been stopped, and the process proceeds to step S67.

In step S67, the power controller 106 determines whether a tampering action has been performed on the housing 31. Specifically, as described above with reference to FIGS. 8 and 9, in a case in which, due to opening, destruction, or the like, of the housing 31, a disconnection occurs between the power controller 106 and the gate of the MOSFET (the MOSFET 304 in the case of the tamper monitoring circuit 105-1 in FIG. 8) in the tamper monitoring circuit 105, the monitoring signal output from the tamper monitoring circuit 105 in which the disconnection occurs has a voltage of approximately zero volts. When any one of the monitoring signals from the tamper monitoring circuits 105-1 to 105-6 has a value equal to or less than the predetermined threshold value, the power controller 106 determines that the tampering action has been performed on the housing 31, and the process proceeds to step S68.

In step S68, the power controller 106 stops the supply of the power to the storage 103. Specifically, any one of the voltages of the monitoring signals from the tamper monitoring circuits 105-1 to 105-6 changes to be equal to or less than the predetermined threshold value, whereby the switch 359 is turned off, and the supply of the power from the power regulator 356 to the storage 103 is stopped. This erases the data stored in the RAM 171 in the storage 103.

In step S69, the memory access controller 102 changes the scramble key, and the tampering action monitoring process finishes. Specifically, when any one of the voltages of the monitoring signals from the tamper monitoring circuits 105-1 to 105-6 changes to be equal to or less than the predetermined threshold value, the scramble-key-change commanding unit 142 turns on the switch 202 in the random number output unit 143 by supplying a signal representing a scramble key change command to the switch 202. Turning on of the switch 202 initiates output of the pseudo-random number from the random number generator 201 to the scramble key buffer 161 via the switch 202. When the pseudo-random number is output for n bits from the random number generator 201, the switch 202 is turned off. In the scramble key buffer 161, a pseudo-random number, formed by an n-bit string and supplied from the random number output unit 143, is stored as a new scramble key in the internal register. In addition, the scramble key buffer 161 supplies and stores the scramble key in the internal memory 162.

In step S69, a bit string value which is not used as a scramble key since address scrambling is not performed and whose digits are all zeroes may be forcibly set as the scramble key.

If, in step S67, it is determined that the tampering action has not been performed on the housing 31, the process returns to step S61, and step S61 and the subsequent steps are executed.

For example, even if the battery 351 is removed for the purpose of stopping the operations of the tamper monitoring circuits 105-1 to 105-6, as described above, the tamper monitoring circuits 105-1 to 105-6 continue to operate. Thus, the tamper proofness of the control module 13 can be improved. In addition, when a predetermined time has elapsed after the battery 351 is removed, the data in the RAM 171 is erased. Thus, the tamper proofness of the control module 13 can be further improved.

Furthermore, it is ensured that a tampering action, such as opening or destruction of the housing 31, is detected. Since, when the tampering action is detected, the data in the RAM 171 is erased, the tamper proofness of the control module 13 can be further improved.

In addition, when a tampering action is detected, the scramble key is changed. Thus, even if the data in the RAM 171 is not erased, analysis of the data in the RAM 171 by using an ICE (in-circuit emulator), or the like, can be made difficult.

The foregoing description exemplifies a case in which the data in the RAM 171, which is a volatile memory, is protected. However, for example, when removal of the battery 351, or opening or destruction of the housing 31 is detected, by erasing or destroying the data in the nonvolatile memory 172, the data in the nonvolatile memory 172 can be protected. In the case of erasing the data in the RAM 171 as the volatile memory, compared with the case of erasing the data in the nonvolatile memory 172, the data can be erased with less power since a processor, such as a CPU, does not need to operate. The capacitance of the capacitor 355 can be suppressed to a low value.

In addition, instead of forming the protection substrates 33 to 36 to have a single layer structure, by forming the protection substrates 33 to 36 to have a multilayer structure, a wire routing pattern may be provided on each layer.

Furthermore, the wire routing pattern of the wire on each protection substrate is not limited to the above-described example. Instead, a wire that is sufficiently thin for the length or width of each face of the housing 31 may be routed at intervals each being sufficiently narrow for the length or width of the face of the housing 31, covering substantially all the faces of the housing 31.

In addition, it is not necessary to provide a wire on each protection substrate. Instead, the wire may be provided on an inner surface of the housing 31, or may be provided between outer and inner surfaces of the housing 31.

In the foregoing embodiment, the battery 351 is only used to allow the control module 13 to operate without using the main power supply 14.

In addition, a technique for coping with removal of the battery 351 in the foregoing embodiment is not limited to the above-described tamper monitoring circuits 105-1 to 105-6. The technique is effective to a tamper monitoring circuit that needs to be supplied with power for operation, for example, a temperature monitoring circuit for monitoring a thermal attack for the purpose of causing a malfunction.

Although, in the foregoing description, the tamper monitoring circuit 105 is provided for each protection substrate, for example, by connecting wires on a plurality of protection substrates in series, the number of tamper monitoring circuits can be reduced.

In addition, when removal of the battery 351 is detected, similarly to the case of detecting a tampering action by the tamper monitoring circuit 105, the scramble key may be changed.

Although the foregoing description exemplifies a case in which a Gold-sequence pseudo-random number is used as a scramble key, the random number or pseudo-random number for use as a scramble key is not limited to the above-described example. For example, an M-sequence pseudo-random number obtained in the case of using only one LFSR may be used, and a physical random number using thermal noise may be used.

In addition, the method for scrambling the address is not limited to the above-described example, but another method that uses a scramble key set on the basis of a random number or pseudo-random number may be used.

Although the foregoing description exemplifies the IC card 2 as a party communicating with the reader-writer 1, the reader-writer 1 can communicate with noncontact-IC-card-function apparatuses such as cellular phones, PDAs (personal digital assistants), timepieces, and computers having noncontact IC card functions.

In addition, the memory access controller 102 shown in FIG. 5 can be applied to a different memory-data reading/writing apparatus other than the reader-writer 1.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A data storage apparatus comprising:
a memory;
monitoring means for monitoring an unauthorized action on data stored in the memory;
a first power supply for supplying power to the monitoring means; and
power storage means for supplying power to the monitoring means when supply of the power from the first power supply to the monitoring means is stopped to maintain the operation of the monitoring means, the power storage means being charged while the power is being supplied from the first power supply to the monitoring means.

2. The data storage apparatus according to claim 1, wherein:
the memory is volatile; and
the first power supply further supplies the power to the memory.

3. The data storage apparatus according to claim 2, further comprising power-supply control means for controlling the first power supply,
wherein:
when supply of the power from the first power supply to the memory is stopped, the power storage means further supplies the power to the memory; and
when a predetermined time has elapsed after the supply of the power from the first power supply to the memory is stopped, the power-supply control means stops supply of the power from the power storage means to the memory.

4. The data storage apparatus according to claim 1, further comprising a second power supply for supplying power to the monitoring means,
wherein:
the first power supply is a backup power supply for supplying power to the monitoring means when the second power supply is turned off; and
the power storage means is charged by one of the first power supply and the second power supply.

5. The data storage apparatus according to claim 1, wherein:
the first power supply is a battery; and
the power storage means is a capacitor.

6. A power control method for a data storage apparatus including a memory, and monitoring means for monitoring an unauthorized action on data stored in the memory, the power control method comprising the steps of:
charging power storage means for supplying power to the monitoring means included in the data storage apparatus while power is being supplied from a power supply to the monitoring means; and
when supply of the power from the power supply to the monitoring means is stopped, supplying power from the power storage means to the monitoring means to maintain the operation of the monitoring means.

7. A communication apparatus for communicating with an apparatus having a noncontact integrated-circuit-card function, the communication apparatus comprising:
- a memory for storing data read from the apparatus having the noncontact integrated-circuit-card function;
- monitoring means for monitoring an unauthorized action on the data stored in the memory;
- a first power supply for supplying power to the monitoring means; and
- power storage means for supplying power to the monitoring means when supply of the power from the first power supply to the monitoring means is stopped to maintain the operation of the monitoring means, the power storage means being charged while the power is being supplied from the first power supply to the monitoring means.

8. A data storage apparatus comprising:
- a memory;
- a monitoring unit monitoring an unauthorized action on data stored in the memory;
- a first power supply supplying power to the monitoring unit; and
- a power storage unit supplying power to the monitoring unit when supply of the power from the first power supply to the monitoring unit is stopped to maintain the operation of the monitoring unit, the power storage unit being charged while the power is being supplied from the first power supply to the monitoring unit.

9. A communication apparatus for communicating with an apparatus having a noncontact integrated-circuit-card function, the communication apparatus comprising:
- a memory storing data read from the apparatus having the noncontact integrated-circuit-card function;
- a monitoring unit monitoring an unauthorized action on the data stored in the memory;
- a first power supply supplying power to the monitoring unit; and
- a power storage unit supplying power to the monitoring unit when supply of the power from the first power supply to the monitoring unit is stopped to maintain the operation of the monitoring means, the power storage unit being charged while the power is being supplied from the first power supply to the monitoring unit.

* * * * *